United States Patent [19]
Patterson

[11] Patent Number: 5,649,877
[45] Date of Patent: Jul. 22, 1997

[54] LINEAR DERAILLEUR

[75] Inventor: Sam Patterson, Chicago, Ill.

[73] Assignee: SRAM Corporation, Chicago, Ill.

[21] Appl. No.: 681,294

[22] Filed: Jul. 22, 1996

Related U.S. Application Data

[63] Continuation-in-part of Ser. No. 517,231, Aug. 21, 1995.
[51] Int. Cl.⁶ ............................................... F16H 9/06
[52] U.S. Cl. ............................................................ 474/80
[58] Field of Search ..................... 474/78–82; 74/475, 74/502.2

[56]       References Cited

U.S. PATENT DOCUMENTS

| | | | |
|---|---|---|---|
| 4,469,478 | 9/1984 | Weiss | 474/80 |
| 5,059,158 | 10/1991 | Bellio et al. | 474/70 |
| 5,102,372 | 4/1992 | Patterson et al. | 474/80 |

OTHER PUBLICATIONS

Exhibits I–VI, photographs of front derailleur, known to exist since at least 1985, public use and sale. Manufacturer unknown.

Exhibits VII–XII, photographs of "Simplex" front derailleur, known to exist since at least 1985, public use and sale.

Exhibits XIII–XV, photographs of "Simplex" front derailleur, known to exist since at least 1985, public use and sale.

Exhibits XVI–XVII, photographs of "Campagnolo" front derailleur, known to exist since at least 1989, brochures, public use and sale.

Exhibit XVIII, advertisement of Elgin Molded Plastics front derailleur, known to exist since at lest 1987, brochures, public use and sale.

*Primary Examiner*—Roger J. Schoeppel
*Attorney, Agent, or Firm*—Ralph C. Francis

[57]            ABSTRACT

A linear derailleur for positioning a drive chain in response to displacement of a plurality of control cables. The derailleur includes a linear actuator having a substantially uniform actuation ratio over the range of motion of the actuator and, hence, derailleur. The linear actuator also has a mean actuation ratio over its range of motion equal to Cos θ:1, where θ equals the angle of inclination of the actuator.

12 Claims, 18 Drawing Sheets

5,649,877

LINEAR DERAILLEUR

RELATED APPLICATION:

This Application is a continuation in part of U.S. Ser. No. 08/517,231, filed Aug. 21, 1995.

TECHNICAL FIELD OF THE INVENTION

The present invention relates in general to bicycle derailleurs, and more particularly to a linear derailleur with a uniform actuation ratio.

BACKGROUND OF THE INVENTION

A conventional road bicycle ("road bike") is generally equipped with two chainrings on the crank and a freewheel containing five to eight gears or sprockets. A road bike freewheel includes sprockets which, in some instances, are only one gear tooth apart from each other, producing a relatively narrow range of gear ratios. A road bike is, in general, configured to be ridden at relatively high speeds on smooth surfaces.

Road bikes are, in many instances, equipped with shifting levers having relatively small take-up spool diameters that produce a relatively small control cable displacement per angular displacement of the spool. This relatively small cable displacement is used to laterally shift a rear derailleur from one sprocket to the next. Road bicycle derailleurs thus have a relatively high actuation ratio, generally defined as the amount of derailleur movement perpendicular to the planes Of the freewheel sprockets (or chainrings) per unit displacement of the derailleur control cable.

More recently, mountain bicycles ("mountain bikes") have been developed which are ridden on trails that are not at all smooth; the "technical" portions of these trails commonly include sharp inclines, large boulders and tree trunks. The mountain bike freewheel thus includes a sprocket set that has a wide range of gear ratios. Further, mountain bikes generally include a third chainring with, in many instances, the diameter of the smallest chainring being substantially different from that of the largest chainring.

The conventional road and mountain bikes both employ (i) a front derailleur to effectuate movement of the drive chain from one chainring to another and (ii) a rear derailleur to effectuate movement of the drive chain from one sprocket to another.

As illustrated in FIG. 1, the conventional front derailleur 70 is generally actuated by a cable system 86. The cable system 86 includes a derailleur control cable 88 which is commonly a Bowden type—that is, the cable 88 is contained within a sheath that terminates in a ferrule affixed to the bicycle frame 12. The cable end 87 is affixed to the derailleur cable clamp 71 disposed on the extended end 79 of linkage member 78.

Typically, the front derailleur 70 takes a parallelogram form, defined by points (i.e., pivots) A, B, C and D. The derailleur 70 is affixed to the bicycle frame 12 by conventional means, such as a clamp 72 and a derailleur mounting member 74. Inboard and outboard linkage members 76, 78 hingedly connect the mounting member 74 to the chain guide 80. The chain guide 80 guides the drive chain 48 onto the selected chainring 40 of the crank 20.

The conventional front derailleur has several major drawbacks. The most significant drawback is the variation in actuation ratio over the range of motion of the derailleur. The variation is caused by virtue of the parallelogram form and is, in most instances, significant. A need therefore exists for a linear derailleur having a substantially uniform actuation ratio over the entire range of motion.

A second drawback of a conventional front derailleur is the number of moving components that are required to position the drive chain. The components are often exposed to water, mud, grit and the like, which could cause jamming or seizing of the derailleur. Further, the alignment and interaction of each component is critical toward efficient operation of the derailleur. A need therefore exists for a derailleur that is simple in operation and has a minimum number of components.

It is therefore an object of the present invention to provide a linear derailleur having a substantially uniform actuation ratio over the range of motion of the derailleur.

It is another object of the invention to provide a derailleur that is simple in operation and has a minimum number of components.

SUMMARY OF THE INVENTION

The linear derailleur of this invention has a substantially uniform actuation ratio over the range of motion of the derailleur. By virtue of the linear actuation, the actuation ratio of the derailleur is independent of derailleur chain guide position, chainring size and/or position, and derailleur mounting position.

In accordance with the objects and advantages of the present invention, the linear derailleur comprises:

- a mounting member affixed to a bicycle frame;
- a linear actuator affixed to the mounting member, the actuator having a substantially uniform actuation ratio over the range of motion of the actuator;
- a chainguide for positioning a bicycle drive chain, the chainguide being operatively connected to the actuator; and
- a plurality of control cables operatively connected to the actuator.

In a preferred embodiment of the invention, the derailleur has a substantially uniform actuation ratio in the range of 0.86–1:1. In an alternative embodiment, the derailleur has a mean actuation ratio in the range of 0.43–0.5:1.

It is an advantage of this invention to provide a linear derailleur having a substantially uniform actuation ratio over the range of motion of the actuator. It is another advantage of this invention to provide a derailleur that is simple in operation, and has a minimum number of components.

BRIEF DESCRIPTION OF THE DRAWINGS

Further aspects of the invention and their advantages may be discerned from reading the following detailed description when taken in conjunction with the drawings in which.

DETAILED DESCRIPTION OF THE INVENTION

The bicycle derailleur of the present invention substantially reduces or eliminates the disadvantages and shortcomings associated with prior art derailleurs. According to the invention, a mounting member, a linear actuator and a control cable are provided for positioning a drive chain in response to displacement of a control cable.

As discussed in detail herein, the linear actuator preferably has a substantially uniform actuation ratio over the range of motion of the actuator. By the term "actuation ratio" it is meant to mean the amount of derailleur (actuator) movement perpendicular to the planes of the chainrings per unit displacement of the control cable. Accordingly, Referring to FIG. 9, wherein line E is perpendicular to the planes of the chainrings and line F is parallel to the line of motion of the actuator 200, and θ is the angle of inclination of the derailleur formed between lines E and F, the actuation ratio is Cos θ :1.

According to the invention, as discussed in detail below, the angle of inclination of the derailleur (θ) may vary from 0°–45°. Preferably, the angle of inclination (θ) is in the range of approximately 0°–30°.

Figure 1:
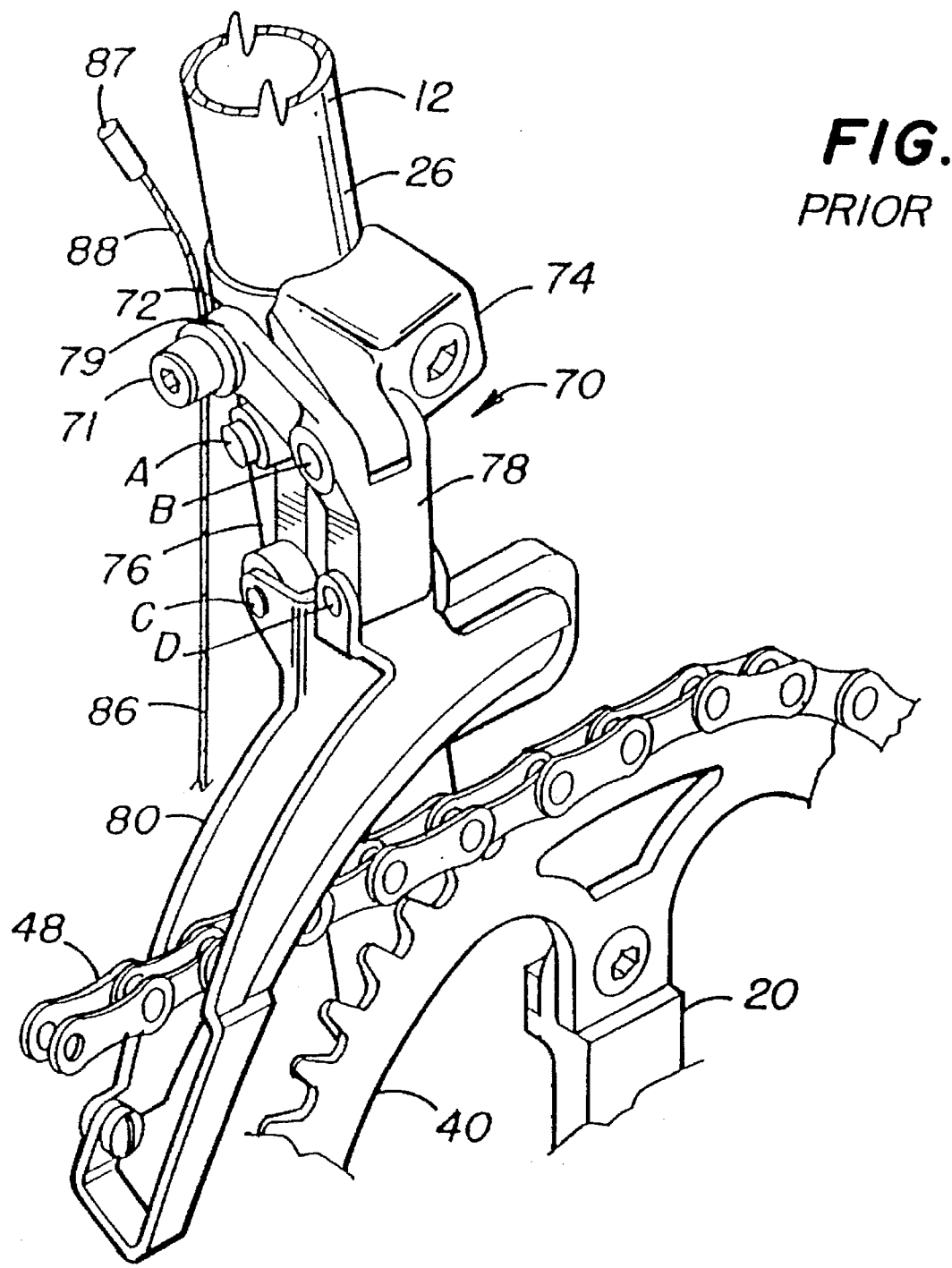
FIG. 1 is a perspective view of a prior art derailleur.
Figure 2:
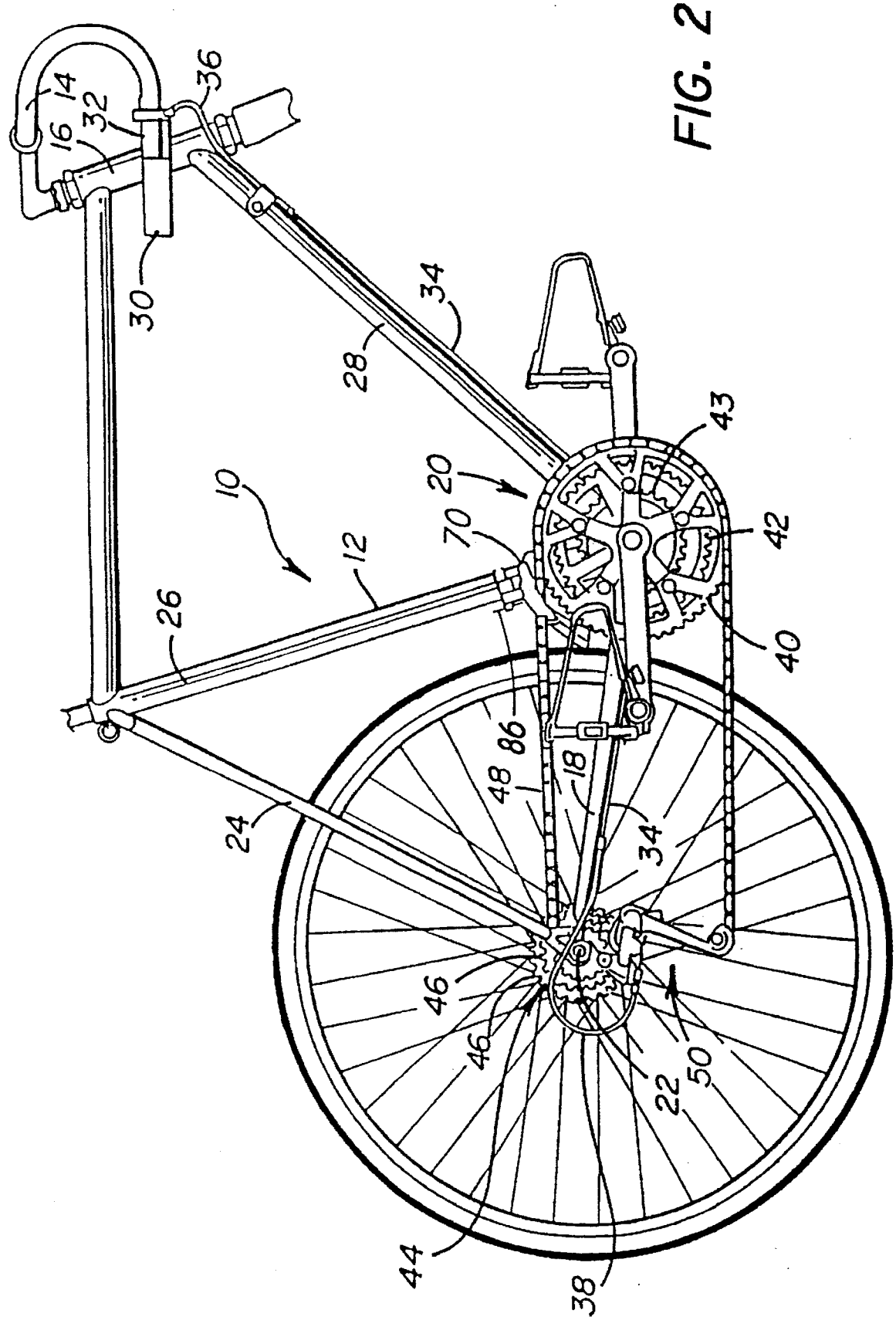
FIG. 2 is an elevational view of relevant portions of a conventional multiple-gear bicycle.

Referring first to FIG. 2, there is shown a conventional bicycle indicated generally at 10. Bicycle 10 includes a frame 12 and handlebar 14 inserted into a fork tube 16. The members of the frame 12 include a chainstay 18 disposed between a crank indicated generally at 20 and a rear hub 22, a seat stay 24 disposed between the hub 22 and the top of a seat tube 26, and a down tube 28 which is disposed between the fork tube 16 and crank 20. Disposed on the end of the handlebar 14 is a static grip 30. Fitting immediately inboard of grip 30 is a hand-rotatable shift actuator 32 by which the rider displaces a control cable 34. This shift actuator 32 can be any of various conventional types; reference is made, for example, to U.S. Pat. Nos. 5,197,927 and 5,102,372 and U.S. patent application Ser. No. 08/295,370 filed Aug. 24, 1994, now U.S. Pat. No. 5,524,501 for different kinds of shift actuators. These U.S. patents and pending U.S. Patent application are fully incorporated by reference herein.

The control cable 34, which preferably is a multi-filament alloy or steel cable, is of the Bowden type. The upper end of the cable 34 resides within a front housing portion 36. Another cable portion resides within a cable housing 38 near the rear hub 22 of the bicycle 10.

Figure 3:
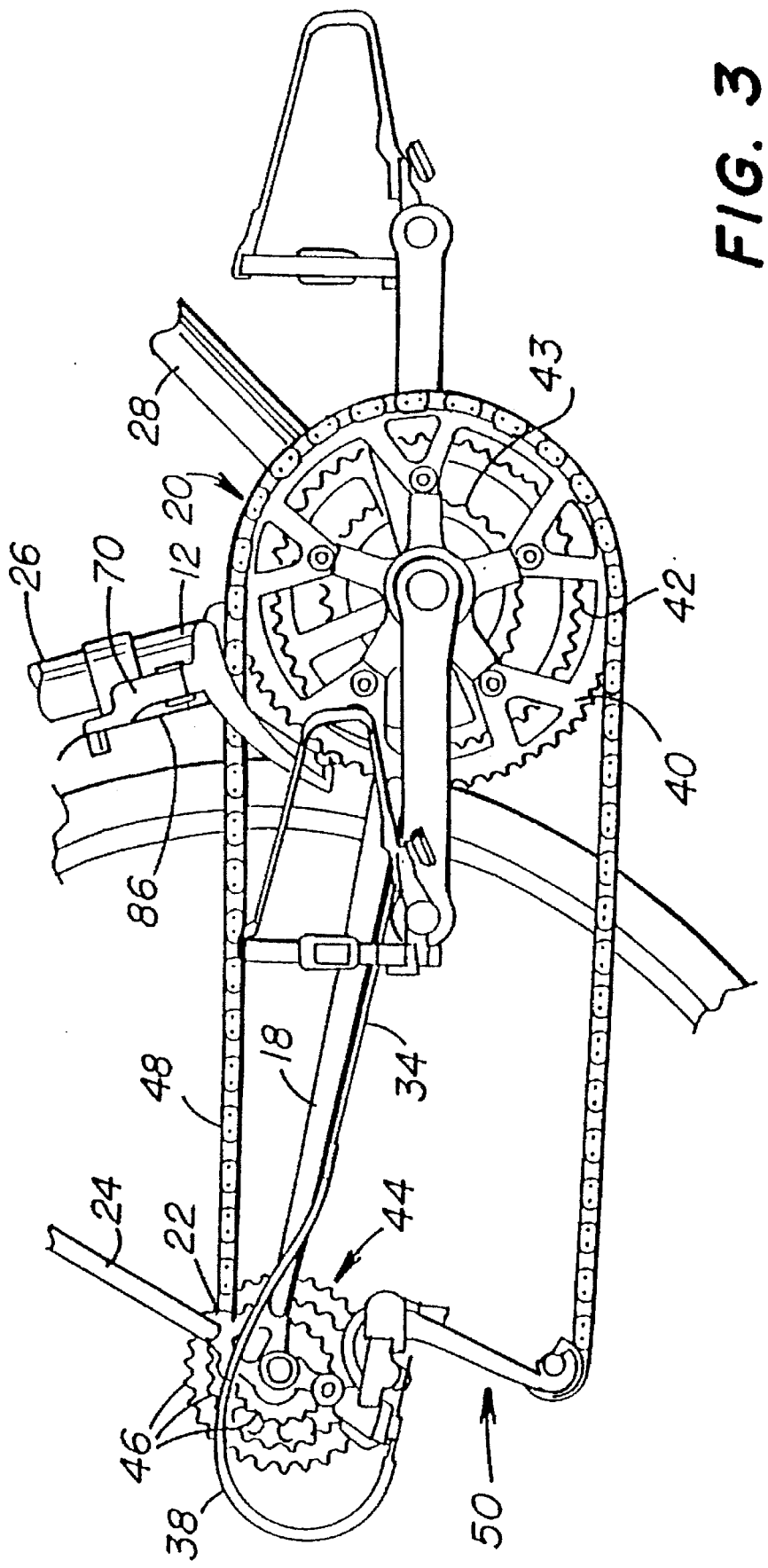
FIG. 3 is an elevational view of a conventional bicycle gear system illustrating the relationship between the rear sprocket, chainrings and drive chain.

In road bikes, the crank 20 would generally have only two chainrings 40 and 42. However, as illustrated in FIG. 3, in mountain bikes, the crank 20 can have a third chainring 43 and the diameter of the smallest chainring 43 can be substantially different from that of the largest chainring 40.

The freewheel, indicated generally at 44, has a plurality of sprockets 46 which are of various sizes. As in crank 20, when the bicycle 10 is configured as a mountain bike, the sprocket sizes can be substantially different from each other. A conventional bicycle drive chain 48 is routed from a selected one of the chainrings 40, 42, 43 around the crank 20 to a selected one of the sprockets 46 on the rear of the bicycle, allowing the rider to select a gear ratio from a combination of chainring and sprocket sizes (See FIG. 3).

A rear derailleur indicated generally at 50 shifts inboard (toward the center line of the bicycle) or outboard (away from the center line of the bicycle) in order to accomplish a shift between different ones of the sprockets 46 within freewheel 44. The derailleur movement is actuated by pulling or releasing control cable 34. With respect to the rear derailleur 50, pulling the control cable 34 moves the derailleur 50 inboard, resulting in a "downshift".

A front derailleur indicated generally at 70 similarly shifts inboard or outboard in order to accomplish a shift between different ones of the chainrings 40, 42, 43 around crank 20. The derailleur movement is actuated by pulling or releasing control cable 86. With respect to the front derailleur 70, pulling the control cable 34 moves the derailleur 70 outboard, resulting in an "upshift".

Figure 4:
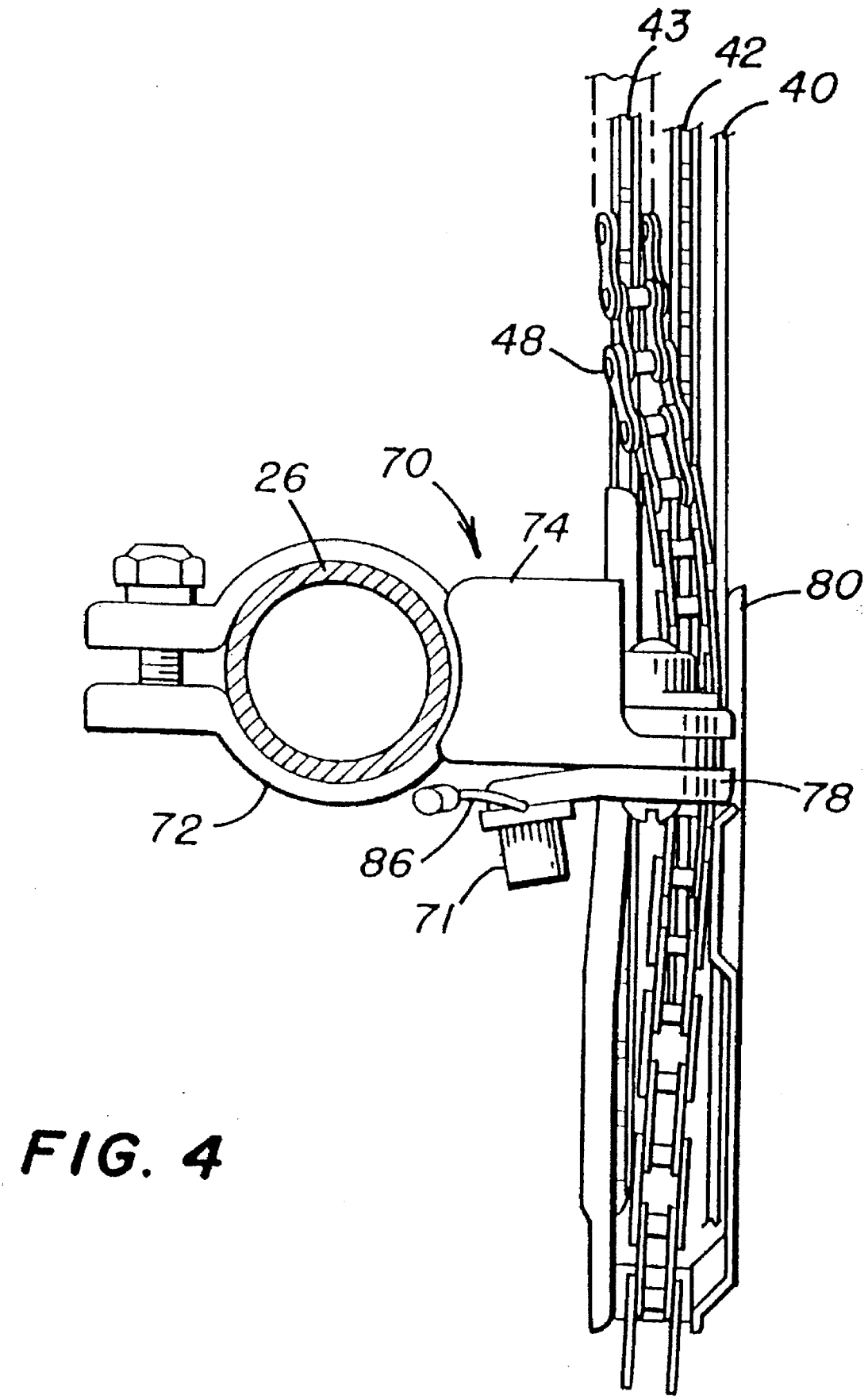
FIG. 4 is a plan view of a chainring system illustrating the condition of switching from a low speed chainring to a higher speed chainring.

As illustrated in FIG. 4, when the chain 48 in mesh with the smaller diameter low speed chainring 43 is switched to the larger diameter, higher speed chainring 42, the chain guide 80 is moved outboard to contact at the inner guide plane 80a thereof with the chain 48 and push the chain 48 outboard. The chain 48 is thus partially disengaged from the chainring 43 and moved radially and axially outwardly to mesh with chainring 42.

As discussed above, a major drawback of a conventional front (and rear) derailleur system is the variation in actuation ratio over the range of motion of the derailleur. The variation in actuation ratio has a significant impact on the shifting characteristics of the bicycle.

A characteristic which is particularly impacted by a variation in actuation ratio is the precision of the indexing shift system. For an indexing shift system to function efficiently, the fixed cable pull increments (i.e., cable movement) controlled by the shift actuator must correspond (via the actuation ratio) to the optimal positions of the derailleur relative to the respective chainrings.

Generally, the cable increments at the shift actuator and the spacings between chainrings are not adjustable. Therefore, for optimal indexing with a conventional front derailleur, the average chain line—that is, the distance from the center line of the seat tube to the center line of the middle chainring—is specified to within a "target" tolerance by the derailleur manufacturer. This often places impractical constraints on the bicycle manufacturer. For example, if the bicycle is assembled with a chain line dimension less than optimal, the derailleur travels farther between indexes (i.e., clicks) than intended. If the chain line is too large, the derailleur will not travel far enough.

Figure 5:
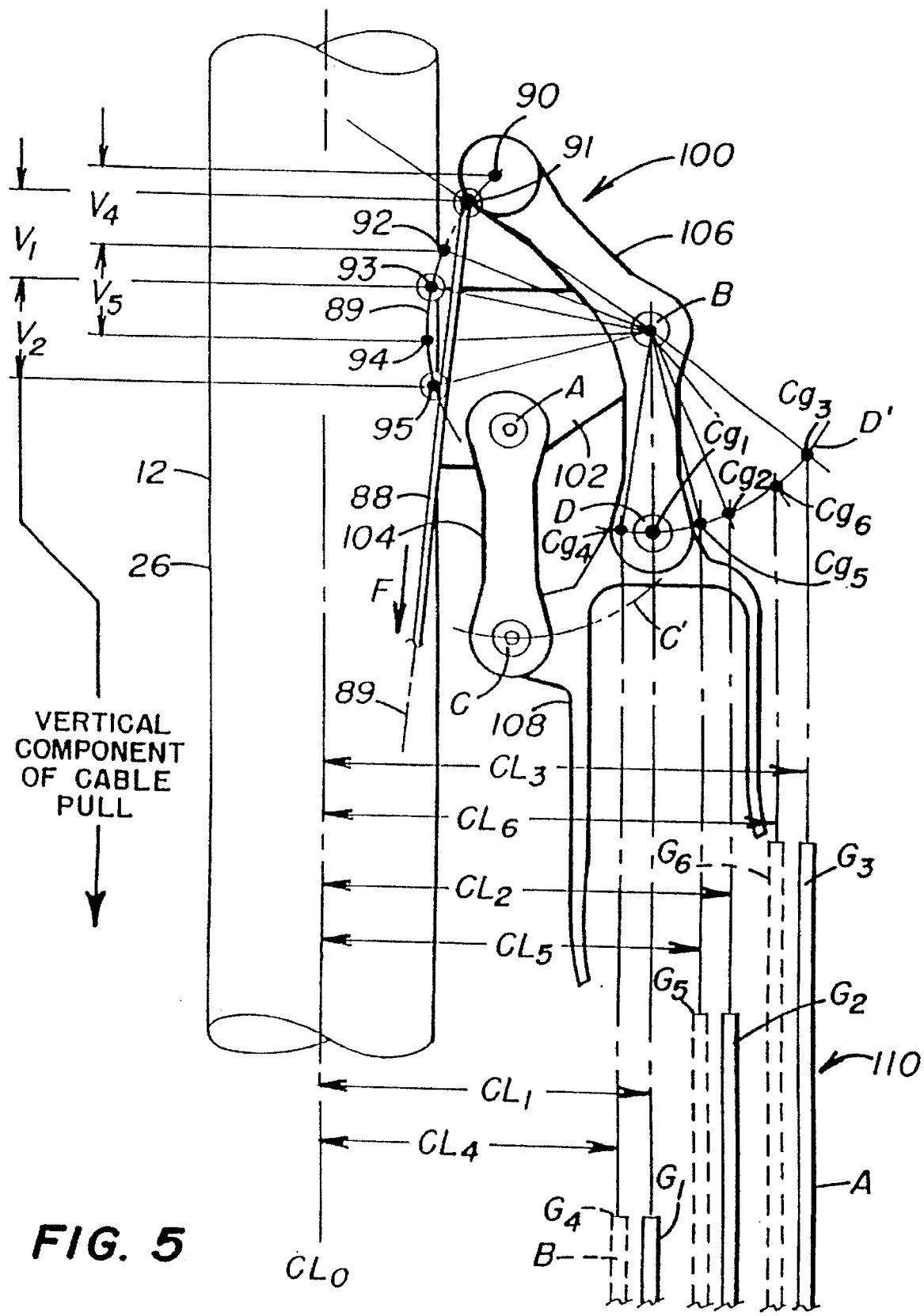
FIG. 5 is a schematic diagram illustrating the variation in actuation ratio of a conventional front derailleur.

Referring now to FIG. 5, there is shown a schematic illustration of the operation and interaction of a conventional front derailleur and chainring system, denoted generally 100 and 110, respectively. FIG. 5 graphically illustrates the variation in actuation ratio of a conventional derailleur system as a function of (i) control cable and, hence derailleur chain guide position, (ii) chainring position, and (iii) derailleur mounting position.

As illustrated in FIG. 5, the derailleur system 100 has a typical parallelogram form defined by points (i.e., pivots) A, B, C and D. The derailleur 100 includes mounting member 102, which is affixed to the bicycle frame 12, linkage members 104, 106, chain guide 108 and control cable 88. Linkage members 104, 106 are hingedly affixed to (i) mounting member 102 at fixed pivots A and B, and (ii) chain guide 108 at pivots C and D. The control cable 88 is affixed to elongated linkage member 106 on the end opposite pivot D. Thus, in operation, when the control cable 88 is pulled along the cable path 89 in the direction indicated by arrow F linkage members 104, 106 pivot about points A and B causing movement of pivot points C and D along paths C' and D', respectively.

Referring now to the chainring system 110, particularly, chainring set A. Chainring set A comprises chainrings (i.e., gears) $G_1$, $G_2$ and $G_3$. The "chain line" (CL) for each chainring $G_1$, $G_2$ and $G_3$ is denoted $CL_1$, $CL_2$ and $CL_3$, respectively. By the term "chain line," as used herein, it is meant to mean the axial distance from the vertical centerline of a chainring to the centerline ($CL_0$) of the bicycle seat tube (26).

As illustrated in FIG. 5, to effectuate a gear change from $G_1$ to $G_2$, the control cable 88 is displaced or pulled (along cable path 89 in the direction indicated by Arrow F) the distance denoted by points 91 and 93. For illustrative purposes, the vertical component of the noted 91/93 cable movement is denoted $V_1$. The actuation ratio of the derailleur between $G_1$ and $G_2$—that is the amount of derailleur movement perpendicular to the planes of the chainrings per unit displacement of the control cable—of the noted derailleur 100 would be approximately 0.92:1.

To effectuate a gear change from $G_2$ to $G_3$, the cable 88 must be displaced the distance denoted by points 93 and 95. The vertical component of the noted 93/95 cable movement is denoted $V_2$. The actuation ratio of the derailleur 100 would be approximately 0.75:1 between $G_2$ and $G_3$.

It can thus be seen that the actuation ratio of a conventional derailleur system is non-linear. Indeed, the actuation ratio will vary as a function of derailleur chain guide 108 position. The variation can, and in most instances will, be significant.

Further, it is a common practice amongst cyclists to substitute various sized chainrings and to vary chainring positions. Indeed, manufacturing specifications and/or constraints may dictate a multitude of chainring positions and, hence, chain line dimensions.

Referring to FIG. 5, there is shown a second chainring set shown in phantom and denoted B. Chainring set B comprises chainrings $G_4$, $G_5$, and $G_6$.

To effectuate a gear change from $G_4$ to $G_5$, the control cable 88 must be displaced the distance denoted by points 90 and 92; the vertical component being $V_4$. The actuation ratio of the derailleur system between $G_4$ and $G_5$ would be approximately 1.037:1.

To effectuate a gear change from $G_5$ to $G_6$, the control cable 88 must be displaced the distance denoted by points 92 and 94; the vertical component being $V_5$. The actuation ratio between $G_5$ and $G_6$ would be approximately 0.859:1.

Thus, merely changing the chainring positions causes significant variations in the actuation ratio of a conventional derailleur (compare $V_1$ to $V_4$; and $V_2$ to $V_5$). This would of course significantly impact the shifting (i.e., indexing) characteristics of the bicycle.

Variations in the derailleur mounting position would have similar, significant effects on the actuation ratio of the system. Again, manufacturing constraints, such as variations in seat tube diameter and derailleur mounting systems (i.e., hardware), would dictate a multitude of derailleur mounting positions and, hence, chain line dimensions.

For example, assuming chain lines $CL_1$–$CL_3$ and chain lines $CL_4$–$CL_6$ are achieved by virtue of two distinct derailleur mounting positions. It can be seen that the variation in cable pull ($V_1$ and $V_4$) to achieve the same axial derailleur movement ($CL_1$–$CL_2$ and $CL_4$–$CL_5$) and, hence, gear change is significant (approximately 13%). There is also a similar significant variation in cable pull ($V_2$ and $V_5$) to achieve the same axial derailleur movement denoted by the distances $CL_2$–$CL_3$ and $CL_5$–$CL_6$ (approximately 14%). The noted variations in actuation ratio would be realized merely by varying the mounting position of a conventional derailleur system.

Figure 6A:
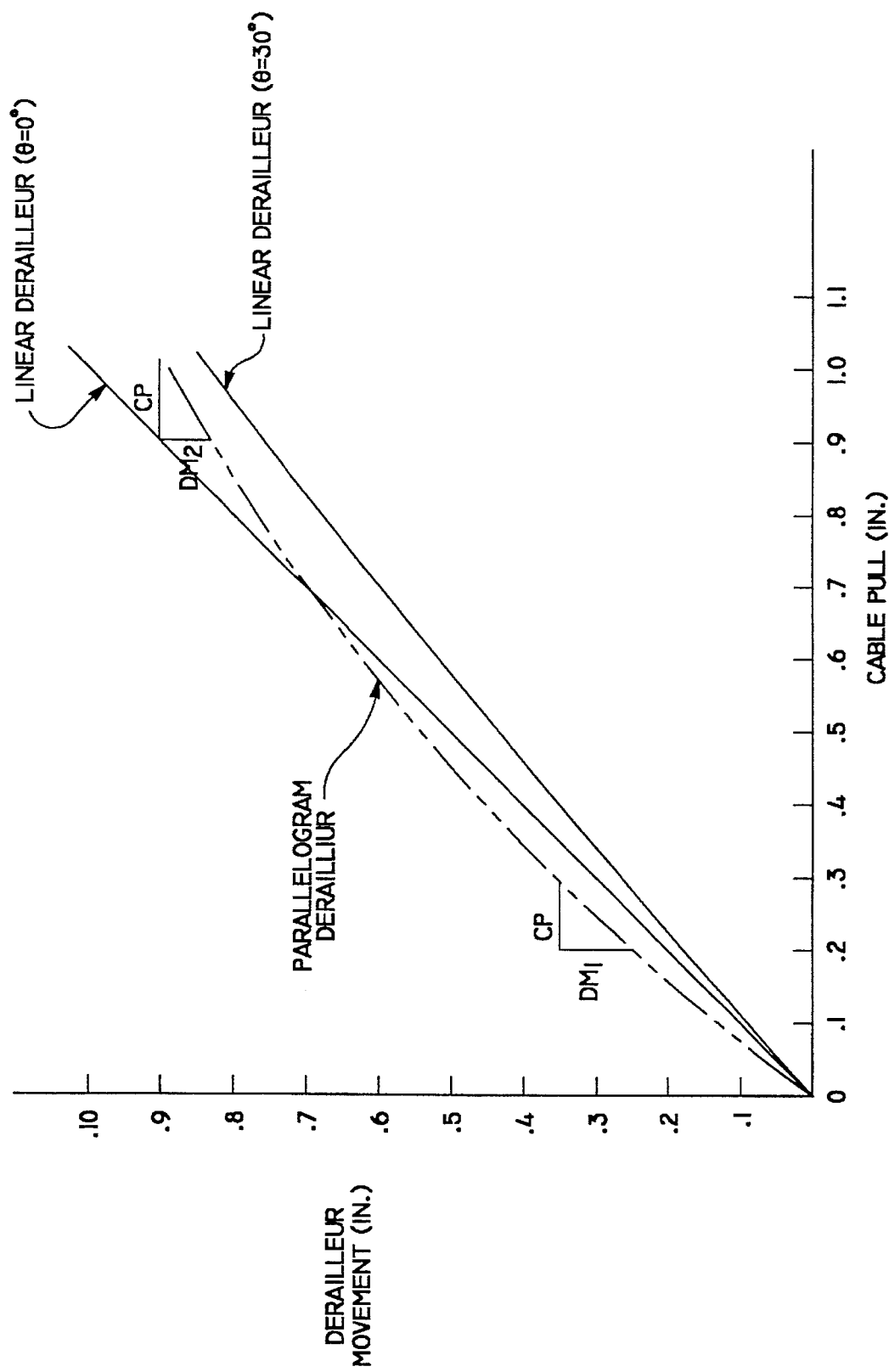
FIG. 6a is a schematic illustration of derailleur displacement versus cable pull for the linear derailleur according to the invention and a conventional front derailleur.

Referring to FIG. 6a, there is shown a schematic illustration of derailleur movement (i.e., displacement) versus cable pull for a linear derailleur according to the invention and a conventional parallelogram derailleur, such as that illustrated in FIG. 5. FIG. 6a graphically illustrates the significant variation in axial derailleur movement ($DM_1$, $DM_2$) for the same cable pull (CP) at various derailleur positions.

Figure 6B:
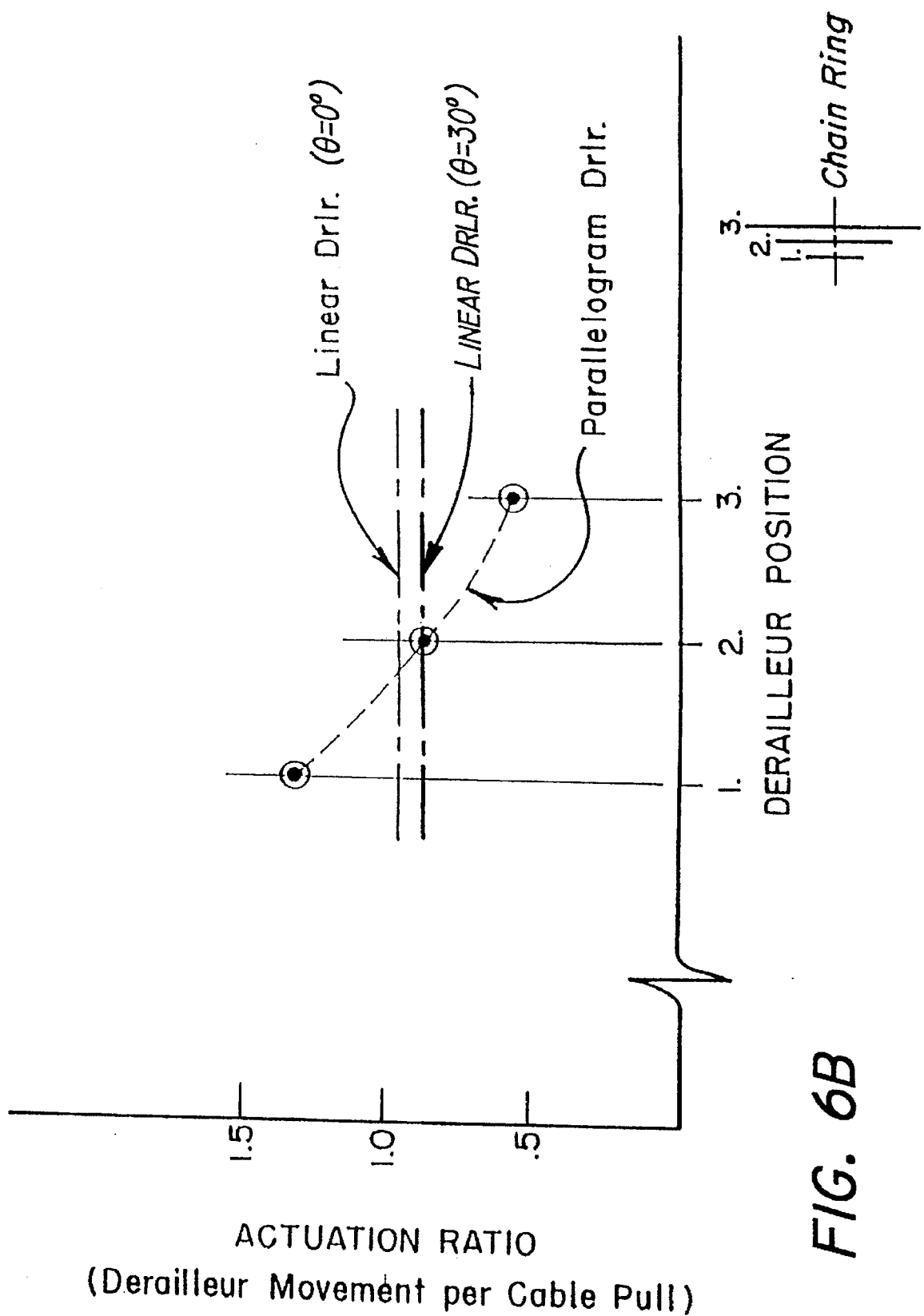
FIG. 6b is a graph of actuation ratio versus chainring position for the linear derailleur according to the invention and a conventional front derailleur.

Referring now to FIG. 6b, there is shown the actuation ratio (i.e., DM/CP) versus chainring curve for the conventional parallelogram derailleur and chainring system (A) illustrated in FIG. 5 and the linear derailleur according to the invention. Again, it can be seen that the actuation ratio of the conventional derailleur system varies significantly over derailleur positions 1–3 (e.g., $Cg_1$–$Cg_3$). In operation, such variations are difficult to predict. It is also very difficult to compensate for the multitude of variations.

As illustrated in FIG. 6b, the linear derailleur of the present invention effectuates uniform and smooth gear changes between chainrings with a uniform linear actuation ratio. The actuation ratio is independent of derailleur chain guide position, chainring size and/or position and derailleur mounting position.

Figure 7:
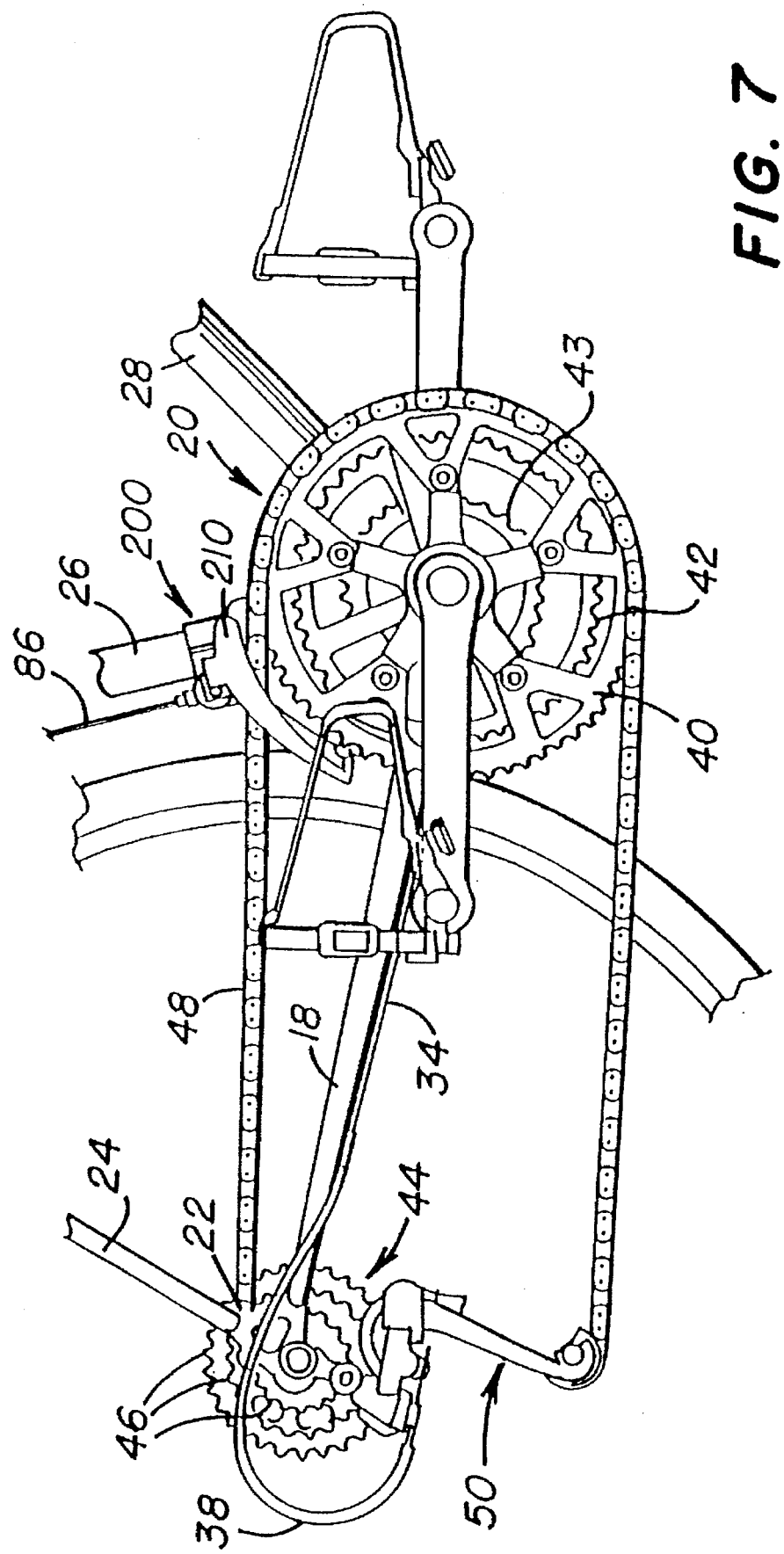
FIG. 7 is an elevational view of a bicycle gear shifting system according to the invention.
Figure 8:
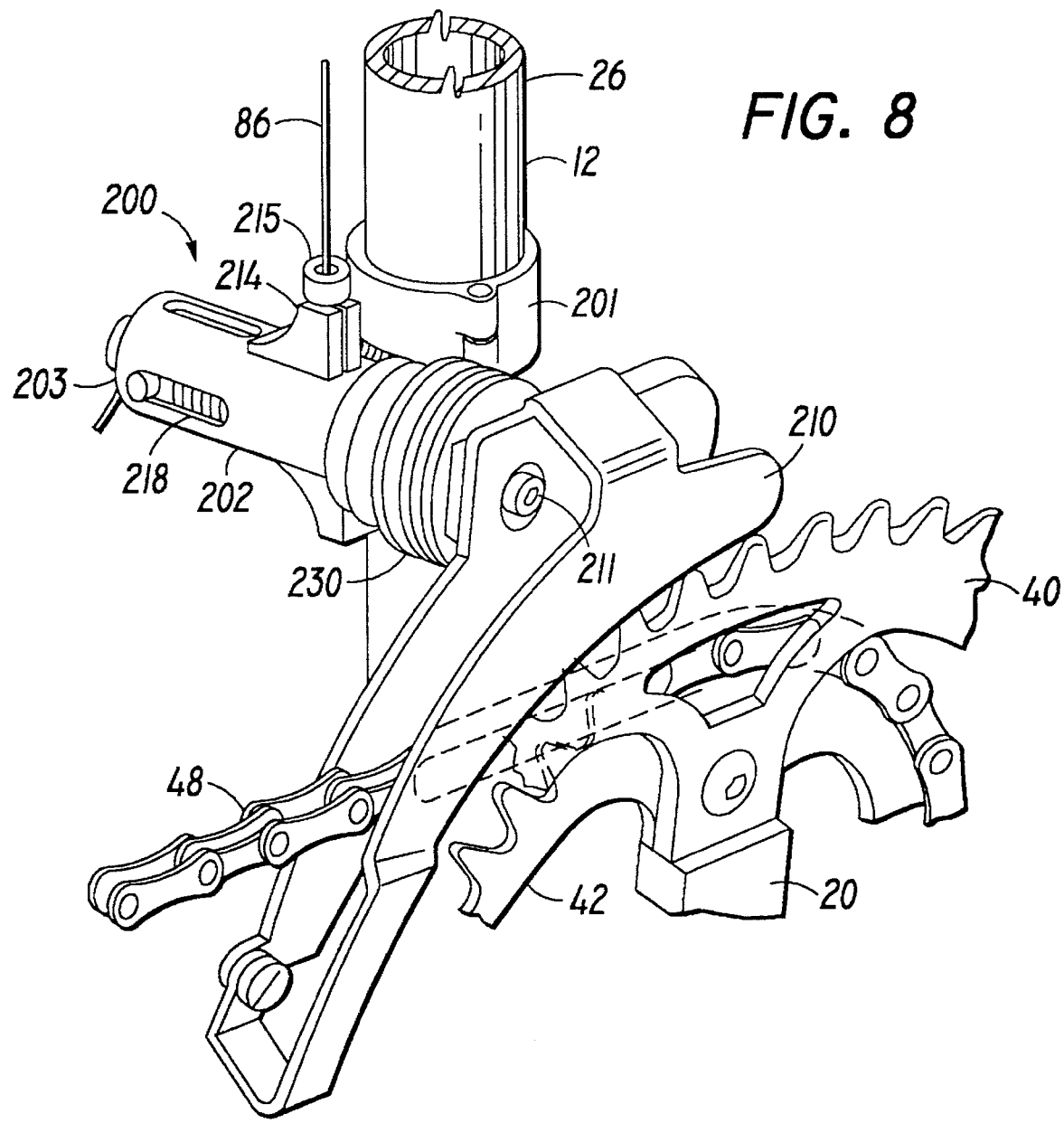
FIG. 8 is a perspective view of an embodiment of the linear derailleur according to the invention.

Referring now to FIGS. 7 and 8, there is shown the linear derailleur of the invention, indicated generally at 200. As discussed in detail herein, the linear derailleur 200 and associated chain guide 210 are designed and adapted such that the chain guide 210 moves generally axially with respect to the bicycle 10 along the axial direction of the chainrings 40, 42 during movement of the derailleur 200.

Although the linear derailleur 200 is described herein with respect to a front derailleur system, the invention is not limited to such construction and use. Indeed, the invention may be employed with rear derailleur systems as well.

A key feature of the invention is that the linear derailleur 200 exhibits a substantially uniform actuation ratio over the range of motion of the derailleur 200. In a preferred embodiment of the invention, the derailleur 200 has a mean actuation ratio in the range of 0.70–1:1. More preferably, the derailleur 200 has a mean actuation ratio in the range of 0.86–1:1.

In an alternative embodiment, illustrated in FIG. 13 and discussed in detail below, the derailleur 200 has a mean actuation ratio in the range of 0.35–0.5:1. More preferably, the mean actuator ratio is in the range of 0.43–0.5:1.

The derailleur 200 is affixed to the bicycle by conventional means, such as a clamp 201. According to the invention, the derailleur 200 includes a housing 202, a piston 204, a control rod 206, and biasing means 208 (See FIG. 9).

The derailleur housing 202 may be constructed out of various conventional materials, such as aluminum or plastic. Preferably, the housing 202 is constructed out of glass filled nylon.

Figure 9:
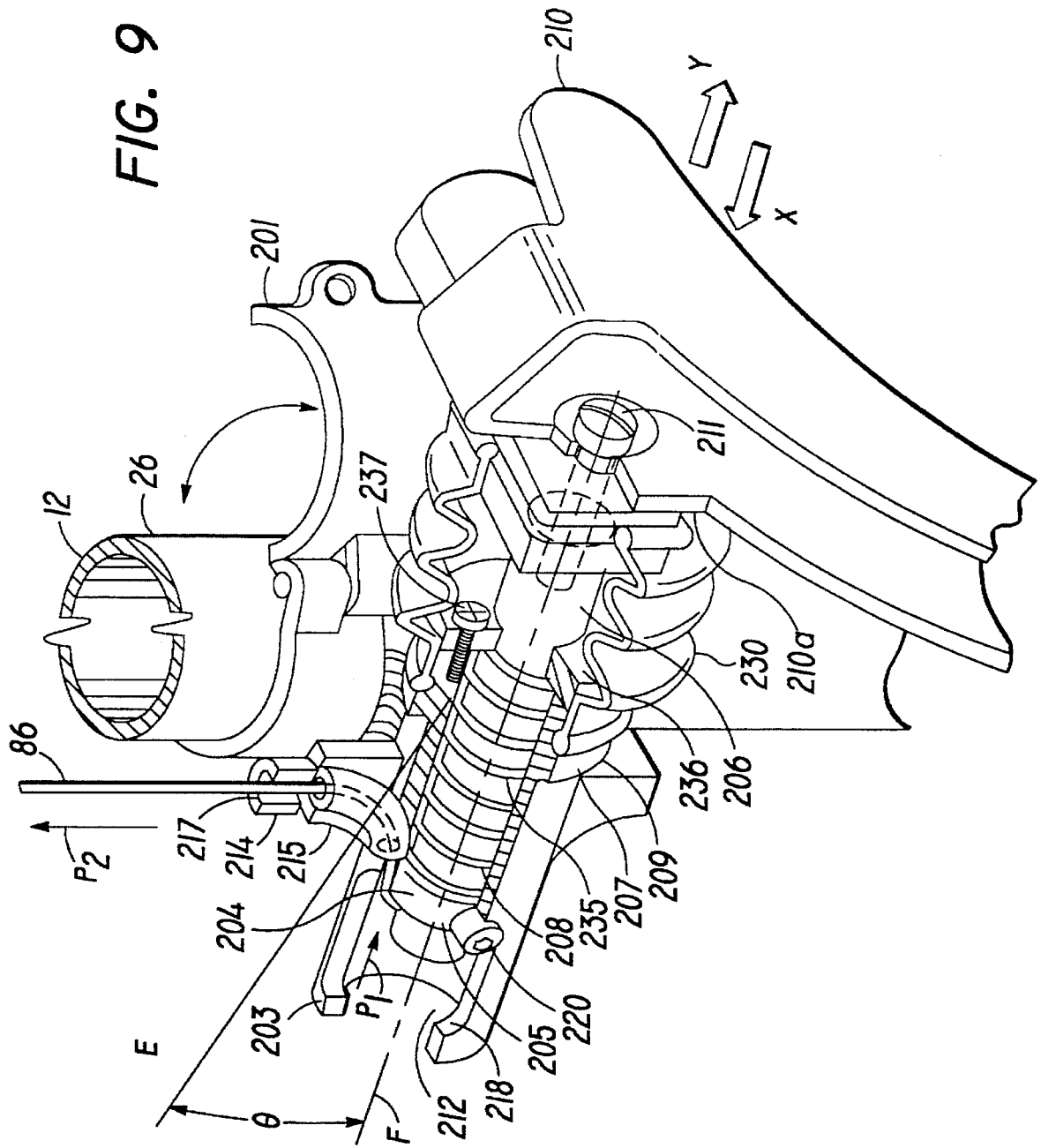
FIG. 9 is a sectional view of the linear derailleur according to the invention.
Figure 10:
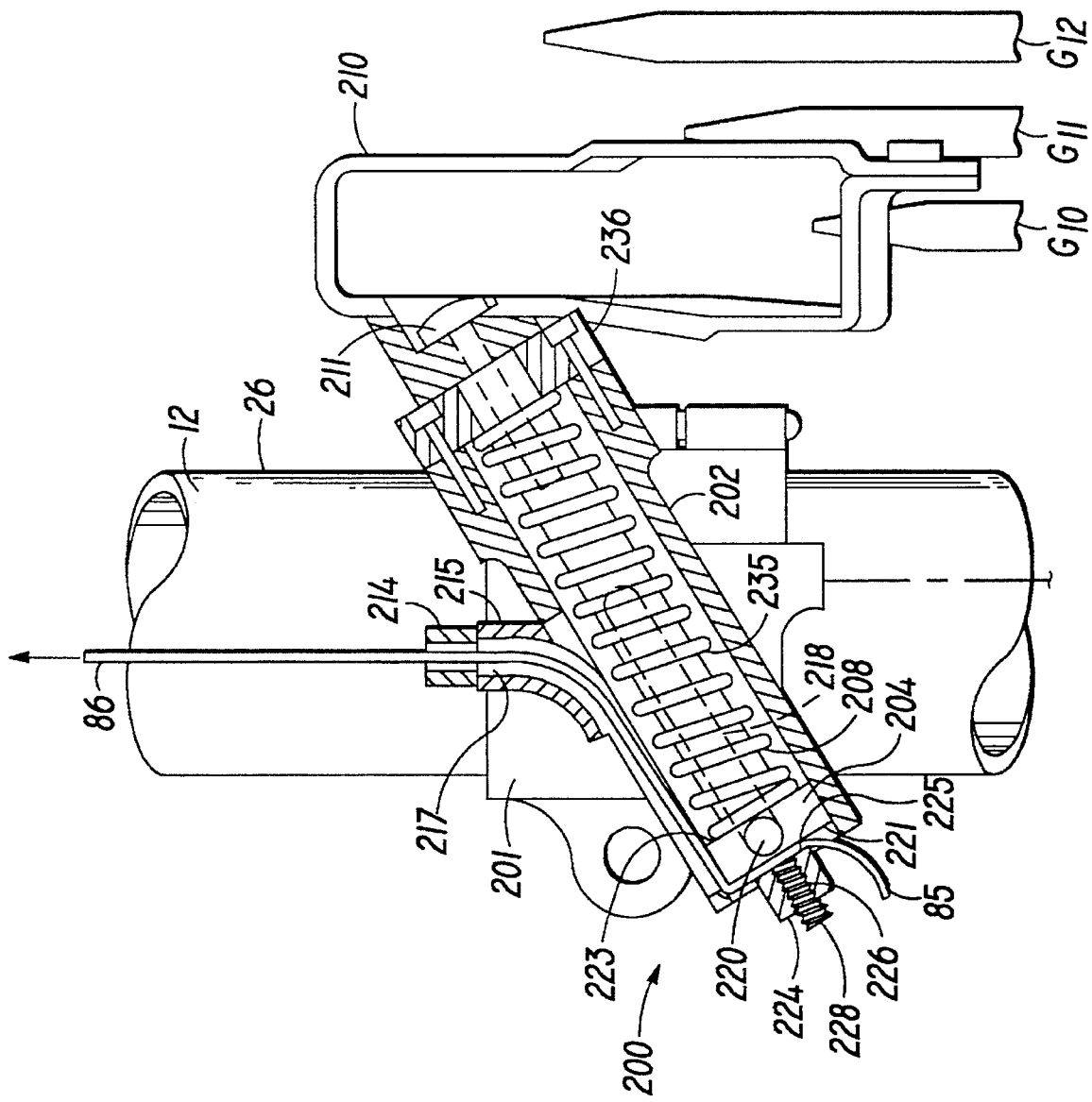
FIG. 10 is a simplified sectional view of the linear derailleur according to the invention.
Figure 11:
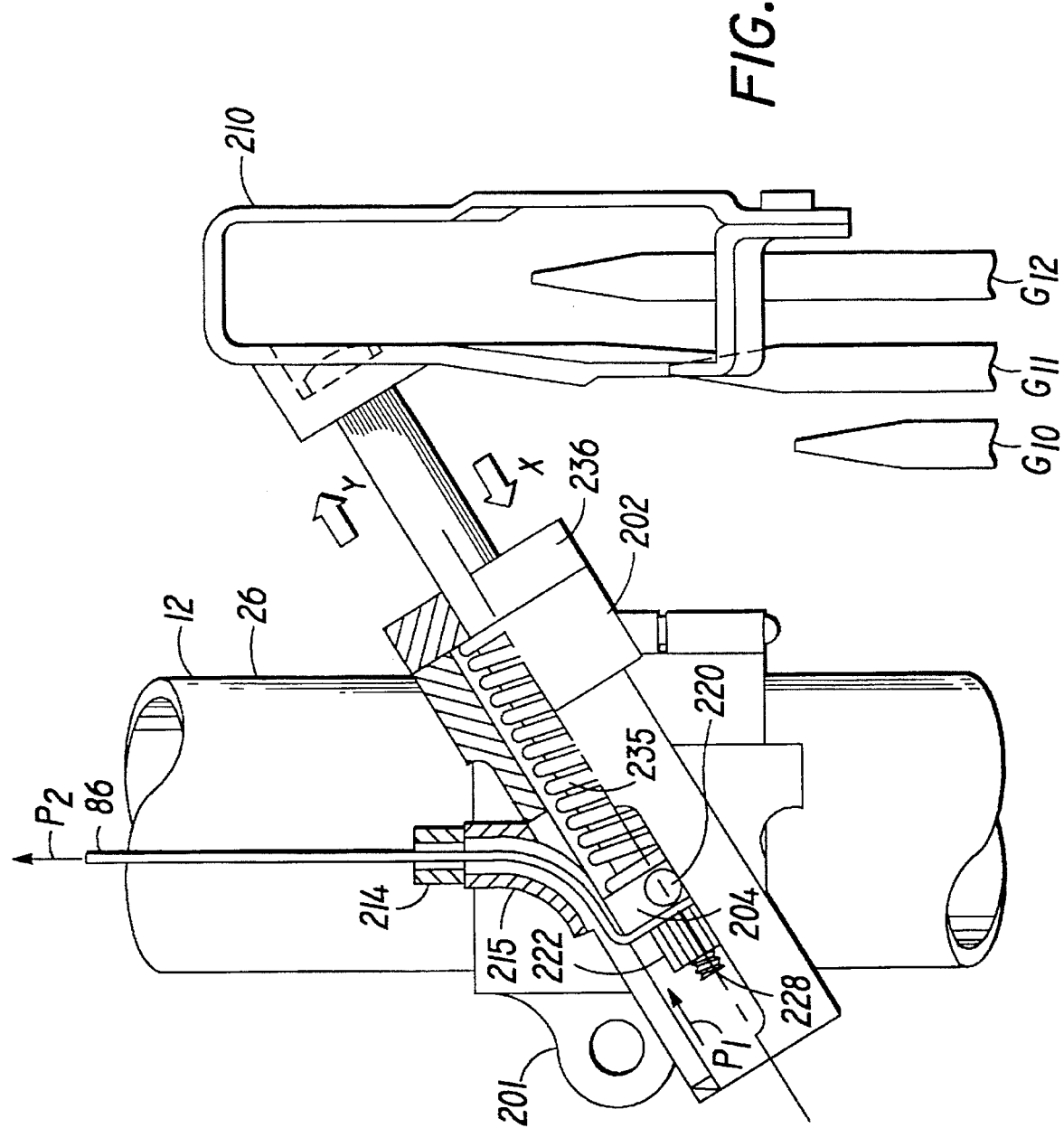
FIG. 11 is a simplified sectional view of the linear derailleur according to the invention, illustrating the uniform linear actuation thereof.

In a preferred embodiment, the housing 202 includes an enclosure 212 therein. As illustrated in FIGS. 9–11, the enclosure 212 is adapted to slideably receive the derailleur piston 204 and control rod 206.

As illustrated in FIGS. 8 and 9, the derailleur housing 202 further includes at least one cable guide 214. The cable guide 214 is designed and adapted to direct the cable 86 along an internal housing path indicated by arrow $P_1$ to an external control cable path indicated by arrow $P_2$ (See FIGS. 9 and 11 .) In a preferred embodiment, the cable guide 214 comprises a housing extension 215 having a cable lumen 217 therein for receiving and guiding the cable 86. The cable guide 214 may be a separate element or formed as an integral unit with the housing 202. As will be recognized by one having ordinary skill in the art, various cable guide configurations may be employed within the scope of this invention.

Figure 12:
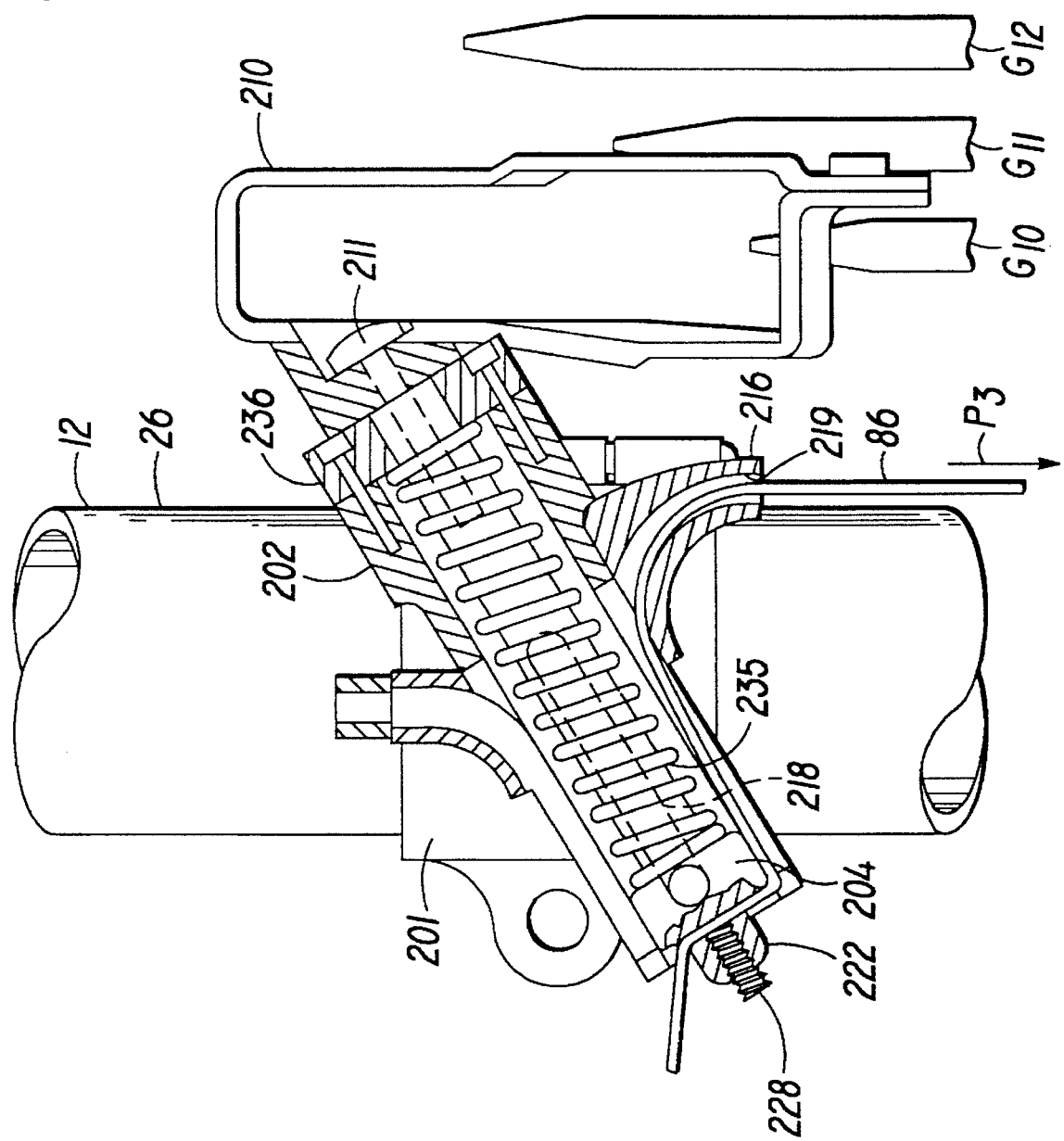
FIGS. 12 and 13 are additional embodiments of the linear derailleur according to the invention, illustrating alternative control cable guides and cable attachment means.

In additional embodiments of the invention, as illustrated in FIG. 12, the housing 202 may include a second cable guide 216 disposed on the bottom of the housing 202. The lower cable guide 216 would also include a cable lumen 219 adapted to receive and guide the cable 86 along an internal axial cable path to an external cable path indicated by arrow $P_3$. The second cable guide 216 would thus facilitate actuation of the linear derailleur 200 from a lower cable position.

As illustrated in FIGS. 8 and 9, the derailleur housing 202 further includes at least one piston guide 218. In a preferred embodiment, the piston guide 218 comprises an elongated slot disposed proximate the rear 203 of the housing 202. According to the invention, the guide 218 extends axially at least the length of travel of the piston 204. The piston guide 218 is designed and adapted to receive a piston guide pin 220 which is preferably affixed to the side 205 of the derailleur piston 204. In operation, the piston guide 218 assures linear (axial) movement of the piston 204, restricting any rotation thereof.

Referring now to FIG. 9, the derailleur piston 204 is preferably slideably received in the housing enclosure 212. However, in additional embodiments of the invention, not shown, the piston 204 may be disposed externally on one end 203 of the housing 202.

According to the invention, the derailleur piston 204 is cylindrically shaped. However, various piston 204 configurations, including a "splined piston", may be employed within the scope of the invention.

The piston 204 may be manufactured out of a conventional light weight material such as injected molded plastic or aluminum. In a preferred embodiment, the piston 204 is manufactured out of a fiber reinforced polymeric material.

Referring now to FIG. 10, the piston 204 includes a cable retainer 224 affixed to one end 221 thereof. The cable retainer 224 preferably comprises a boss 224 having a lumen 225 therein adapted to receive the cable end 85. The boss 224 includes a threaded portion 226 which extends axially through the boss 224 and is in communication with the boss lumen 225. The threaded portion 226 is adapted to receive the cable retainer bolt 228. In operation, the cable end 85 is positioned in the boss 224 and the retainer bolt 228 is tightened. The bolt 228 contacts the cable end 85 and secures the control cable 86 within the boss 224 and, hence, to the control piston 204.

According to the invention, the derailleur 200 further includes a control rod 206 (see FIGS. 9 and 11.) The control rod 206 is preferably affixed to the control piston 204 on the forward face 223 thereof. The control rod 206 may similarly be constructed out of a conventional light weight material such as injection molded plastic or aluminum.

As illustrated in FIGS. 8 and 9, affixed to the opposite end of the control rod 206 is the derailleur chain guide 210. The chain guide 210 may be affixed to the control rod 206 by conventional means, such as bolt 211.

A derailleur bellows 230 is also provided to seal the housing enclosure 212 and actuator components 204, 206. The bellows 230 is designed and adapted to circumscribe the forward end of the control rod 206 and the outer surface 207 of the housing 202 on one end 209 thereof. The bellows 230 is preferably sealably secured to the outer surface 207 of the housing end 204 and to the chain guide 210 on the inner face 210a thereof. The bellows 230 may be constructed out of various conventional materials such as KRAYTON®.

In additional embodiments of the invention, not shown, the derailleur housing 202 may also include a housing cap. The housing cap would be sealably secured to the housing end 203 to provide further sealing of the derailleur enclosure 213 and components 204, 206.

According to the invention, the linear derailleur 200 is also provided with biasing means 208 which preferably provides a "return force" in a direction indicated generally by arrow X (See FIGS. 9 and 11 .) As illustrated in FIG. 9, in a preferred embodiment the biasing means 208 comprises a conventional coil spring 235. The coil spring 235 is preferably disposed in the housing enclosure 212 and is adapted to circumscribe the derailleur control rod 206.

As illustrated in FIGS. 9 and 10, a spring retainer 236 is also provided which is removably affixed to the housing 202 on one end 209 thereof by conventional means, such as bolt 237. In operation, the spring 235 abuts the forward face 223 of the piston 204 on one end thereof and is maintained in that position throughout the range of motion of the derailleur by the spring retainer 236.

Figure 14:
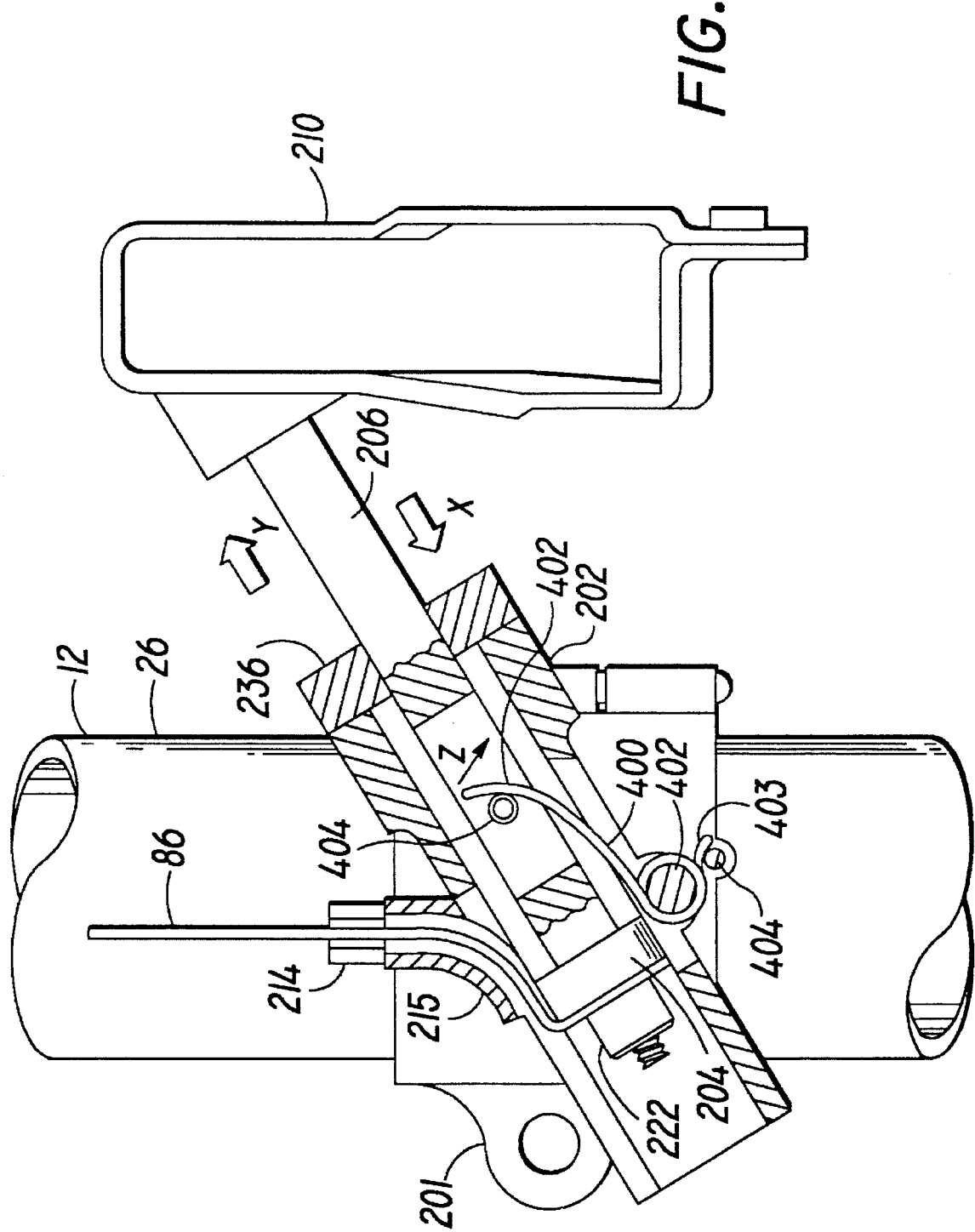
FIGS. 14, 15 and 16 are yet further embodiments of the linear derailleur according to the invention, illustrating alternative biasing means of the linear actuator.

As will be appreciated by one having ordinary skill in the art, various biasing means may be employed to provide a "return force". In the embodiment illustrated in FIG. 14, the biasing means comprises a torsion spring 400. The spring 400 includes a curved tang portion 401 and a spring projection 403 on the opposite end thereof.

The spring 400 is preferably positioned on the derailleur 200 via a spring mounting pin 402 such that spring projection 403 engages the stop pin 404. Thus, when the piston 204 moves in the direction denoted by arrow Y, the spring curved tang portion 401 bends in the direction denoted by arrow Z, producing a uniform biasing force (i.e., return force) in the direction denoted by arrow X.

Figure 15:
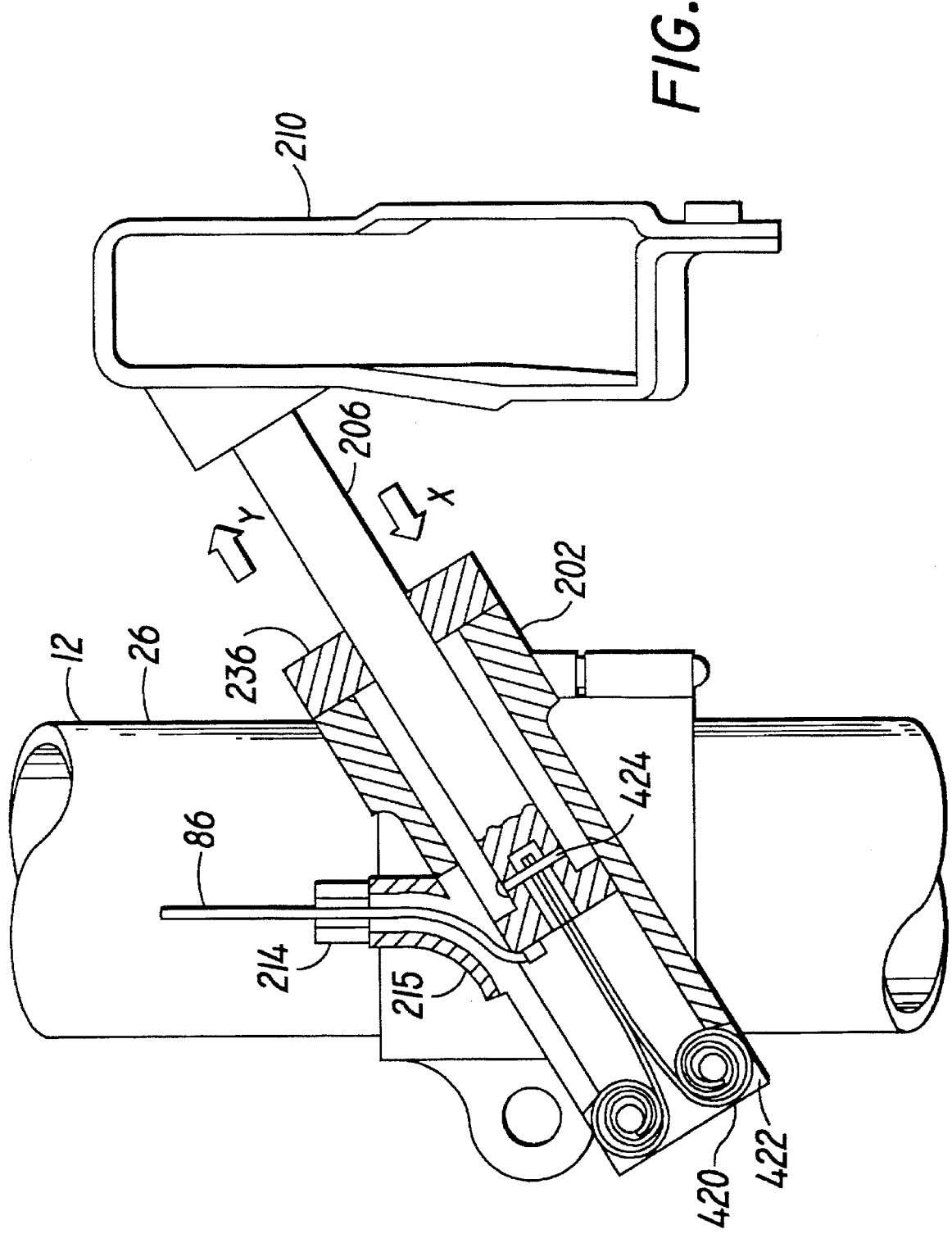

Referring to FIG. 15, there is shown an additional embodiment of the invention where a "TENSATOR®" spring 420 is employed. In the noted embodiment, the spring 420 attaches to the piston 204 (via spring pin 424) and abuts the rear spring retainer 422 of the derailleur 200. The spring 420 is retained in the piston 204 via spring pin 424. As the piston 204 moves in the direction denoted by arrow Y, spring 420 similarly produces a uniform biasing force (i.e., spring constant ≈0) in the direction denoted by arrow X.

Figure 16:
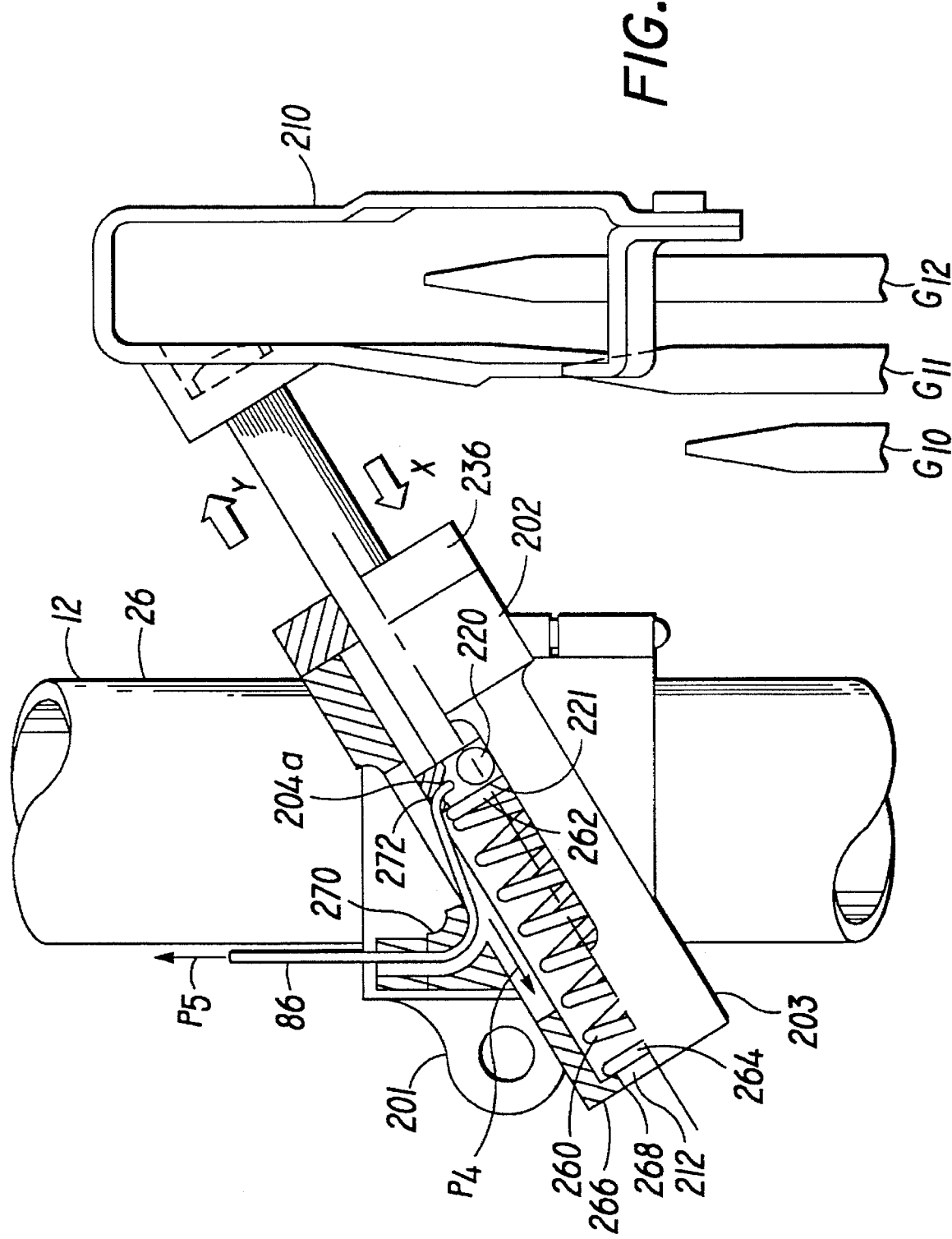

In an alternative embodiment of the invention, illustrated in FIG. 16, the biasing means provides a "return force" in the direction indicated generally by arrow Y. In the noted embodiment, the biasing means similarly comprises a coil spring 260. However, in this instance the coil spring 260 is disposed in the housing enclosure 212 such that the end of the spring 262 abuts the rearward face 221 of the piston 204 and the other end of the spring 264 abuts a rear spring retainer 266.

As illustrated in FIG. 16, the rear spring retainer 266 comprises an inwardly projecting radial ring 268 disposed proximate the rear of the housing 203. According to the invention, the rear spring retainer 266 may be formed as an integral unit with the housing 202 or attached thereto as a separate element.

Figure 13:
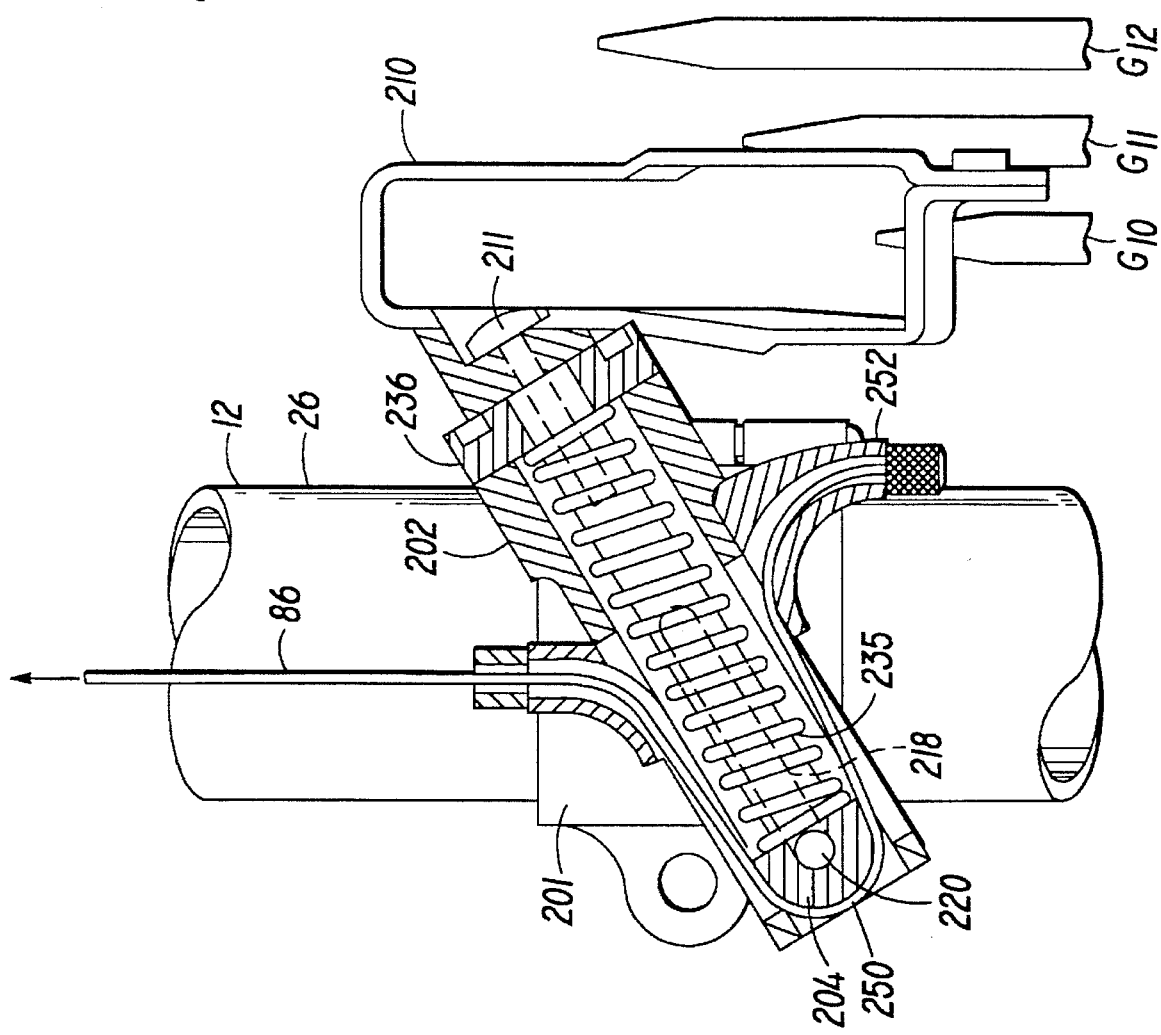

In additional embodiments, not shown, the rear spring retainer 266 may comprise a rear cap similar to the front spring cap 236 illustrated in FIG. 13. The rear spring cap would be removably attached to the rear of housing 203 by conventional means, such as a plurality of screws.

In the alternative embodiment illustrated in FIG. 16, the housing 202 similarly includes at least one cable guide 270. The cable guide 270 is designed and adapted to direct the cable 86 along an internal housing path indicted by arrow $P_4$ to an external cable path indicted by arrow $P_5$.

In the noted embodiment, the piston 204a similarly includes means to retain the cable 86. As illustrated in FIG. 16, the cable retainer means includes a piston lumen 272 extending through the piston 204a and aligned generally parallel to the piston faces. According to the invention, the piston lumen 272 is designed and adapted to receive the cable end. The cable lumen 272 is also in communication with the piston threaded portion (not shown) which is adapted to receive the piston guide pin 220 whereby when the pin 220 is positioned in the piston threaded portion the pin end engages and secures the cable end.

Figure 17:
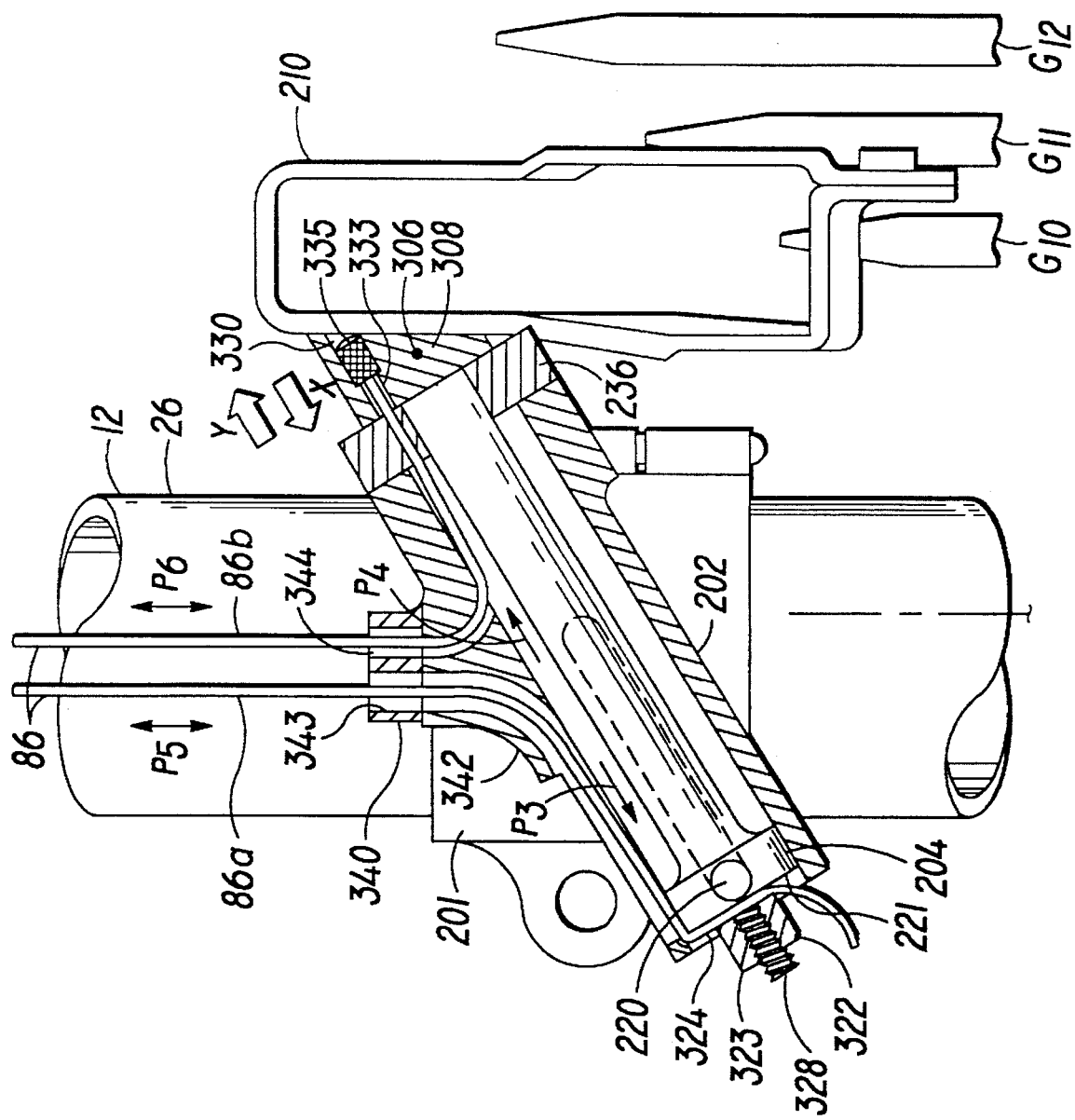
FIG. 17 is an alternative embodiment of the linear derailleur according to the invention, illustrating a dual control cable configuration.

In an additional embodiment, illustrated in FIG. 17, a first actuation force in a direction denoted by Y and a second actuation force in a direction denoted by X are provided by control cables 86a and 86b. As will be recognized by one having skill in the art, two ends of one control cable 86 may be employed within the scope of the invention.

In the noted embodiment, the piston 204 includes a first cable retainer 322 affixed to one end 221 thereof. The cable retainer 322 preferably comprises a boss 323 having a lumen 324 therein adapted to receive cable end 86a. The boss 323 similarly includes a threaded portion, not shown, which extends axially through the boss 323 and is in communication with the boss lumen 324. The threaded portion is adapted to receive the cable retainer bolt 328. In operation, the cable end 86a is positioned in the boss 323 and retainer bolt 328 is tightened. The bolt 328 contacts the cable end 86a and secures the control cable end 86a within the boss 323 and, hence, to the control piston 204.

According to the invention, the derailleur further includes a second cable retainer 330 affixed to the control rod end 306. In the noted embodiment, the cable retainer 330 comprises a cable recess 332 disposed in the control rod attachment means 308. The cable recess 322 is adapted to receive the control cable end 86b and the control cable end cap 335 disposed on the cable end 86b.

As illustrated in FIG. 17, the derailleur similarly includes a cable guide 340. The cable guide 340 is designed and adapted to direct the cable ends 86a and 86b along internal housing paths indicated by arrows $P_3$ and $P_4$ to external cable paths indicated by arrows $P_5$ and $P_6$. The cable guide 340 preferably comprises a housing extension 342 having a pair of cable lumens 343 and 344 therein for receiving and guiding the cable ends 86a and 86b. The cable guide 340 may be a separate element or formed as an integral unit with the housing 202. As will be recognized by one having ordinary skill in the art, various cable guide configurations and cable attachment means may be employed within the scope of this invention.

Referring now to FIG. 9, in the illustrated embodiment, the derailleur 200 is mounted to the bicycle frame 12 at an angle ($\theta$) of approximately 25°. The mounting angle $\theta$ may be varied by affixing the derailleur housing 202 to the derailleur clamp 201 at the predetermined mounting angle. In additional embodiments of the invention, not shown, the derailleur 200 may include variable mounting angle adjustment means, such as a mounting plate with detent positions adapted to engage a housing projection.

FIGS. 10 and 11 illustrate the uniform linear actuation of the derailleur 200. To move the chain guide 210 from a central position proximate chainring $G_{10}$ (FIG. 10) to a position proximate chainring $G_{12}$ (FIG. 11), the control cable 86 is pulled along the cable path indicated by arrow $P_2$ (i.e. upshifting). As the cable 86 is pulled, the derailleur piston 204 (and control rod 206) moves axially within the housing enclosure 213 in the direction indicated by arrow Y and compresses return spring 235. The chain guide 210 thus moves axially and, in this instance, upwardly in relation to the chainrings $G_{10}$, $G_{11}$ and $G_{12}$.

To return the chain guide 210 to the original position proximate chainring $G_{10}$ (i.e., downshift), the cable 86 is released and the return spring 235 biases the piston 234 and control rod 206 in the direction indicated by arrow X.

It can thus be seen that the linear actuator of the invention effectuates uniform and smooth gear changes between chainrings with a uniform actuation ration that is independent of derailleur chain guide position, chainring size and derailleur mounting position. Although the actuator improvements are achieved by virtue of the linear, uniform actuation and the illustrated mounting angle, the invention is not limited to such construction. In additional embodiments, not shown, the derailleur housing may be mounted perpendicular to the chainring plane(s) (i.e., $\theta=0°$). The chain guide would thus move along a plane perpendicular to the chainring plane(s).

Referring now to FIG. 13, there is shown yet another embodiment of the invention. In the noted embodiment, the control cable 86 is routed through a piston guide 250 and affixed to a lower portion 252 of the derailleur housing 202. With the noted cable 86 configuration, the actuation ratio would be approximately ½ the actuation ration of the embodiments illustrated in FIGS. 8–11. Again, the actuation ratio remains constant (and linear) throughout the range of motion of the derailleur.

While preferred embodiments and their technical advantages have been described in the above detailed description and illustrated in the drawings, the present invention is not limited thereto but only by the scope and spirit of the appended claims.

What is claimed is:

1. A bicycle derailleur for positioning a drive chain on gears of a multistage gear assembly having a plurality of axially-spaced generally parallel gears, comprising:

a mounting member attachable to a bicycle frame;

a linear actuator supported relative to said mounting member, said linear actuator being moveable in a first and a second direction along a substantially linear line of motion adapted to correspond to an axial direction when said mounting member is attached to the bicycle frame, said linear actuator having a substantially uniform actuation ratio over the range of motion of said actuator;

a chain guide for positioning a bicycle drive chain, said chain guide being operatively connected to said actuator; and a plurality of control cables, said cables being operatively connected to said actuator, said control cables providing a first actuation force and a second actuation force along a plane substantially parallel to the line of motion of said linear actuator.

2. The derailleur of claim 1 wherein said linear actuator has a mean actuation ratio over the range of motion of said actuator equal to Cos $\theta$:1, where angle $\theta$ equals the angle of inclination of said actuator.

3. The derailleur of claim 1 wherein said actuator has a mean actuation ratio in the range of 0.70–1:1.

4. The derailleur of claim 1 wherein said actuator has a mean actuation ratio in the range of 0.86–1:1.

5. The derailleur of claim 1 wherein said actuator has a mean actuation ratio in the range of 0.35–0.5:1.

6. The derailleur of claim 1 wherein said actuator has a mean actuation ratio in the range of 0.43–0.5:1.

7. The derailleur of claim 1 wherein said actuator includes a housing having an enclosure therein;

an elongated control rod having a first and second end disposed within said housing enclosure; and a control piston having a first and second direction of motion, said control piston being affixed to said first end of said control rod.

8. The derailleur of claim 7 wherein said chain guide is operatively connected to said second end of said control rod.

9. The derailleur of claim 7 wherein said piston is disposed within said housing.

10. The derailleur of claim 7 wherein said housing enclosure includes a control piston guide.

11. The derailleur of claim 7 wherein said actuator includes first biasing means in said first direction of motion and second biasing means in said second direction of motion.

12. The derailleur of claim 1 wherein said actuator includes at least one control cable guide.

* * * * *